United States Patent [19]
Hahn

[11] 3,970,159
[45] July 20, 1976

[54] DOSING DEVICE FOR PNEUMATIC DELIVERY SYSTEMS
[75] Inventor: Horst Hahn, Offenbach am Main, Germany
[73] Assignee: Firma F. J. Gattys Verfahrenstechnik GmbH, Germany
[22] Filed: Aug. 4, 1975
[21] Appl. No.: 601,534

[30] Foreign Application Priority Data
Aug. 12, 1974  Germany............................ 2438699

[52] U.S. Cl. .............................. 177/123; 141/128; 302/3
[51] Int. Cl.² ........................................ G01G 13/10
[58] Field of Search ................... 177/122, 123, 116; 302/3, 59; 141/128, 83; 209/239, 237, 236

[56] References Cited
UNITED STATES PATENTS
| | | | |
|---|---|---|---|
| 801,706 | 10/1905 | Beakbane et al. | 177/123 |
| 952,587 | 3/1910 | Sonander | 177/123 |
| 1,546,360 | 7/1925 | Bates | 141/128 X |
| 3,182,738 | 5/1965 | Frazel | 177/123 X |
| 3,545,281 | 12/1970 | Johnston | 209/239 X |

Primary Examiner—Joseph W. Hartary
Attorney, Agent, or Firm—McGlew and Tuttle

[57] ABSTRACT

A dosing device for a pneumatic delivery system particularly for powdery granular and similar coarse and fine grain materials comprises a first delivery tube defining a first conduit for the coarse dosing having a coarse dosing discharge. A second delivery tube defining a second conduit for fine dosing has a fine dosing discharge and it communicates with the first delivery tube through an intermediate housing having a screen therein for the passage of the fines from the coarse dosing conduit into the fine dosing conduit. The material is delivered by a pneumatic delivery tube into the coarse dosing conduit and it may operate to discharge the coarse feeding of material into a weighing tank. When the coarse conduit is shut off when the amount of weighted material approaches the desired value a feed screw in the fine conduit delivers an additional amount of material into the weighing receptacle.

8 Claims, 3 Drawing Figures

DOSING DEVICE FOR PNEUMATIC DELIVERY SYSTEMS

BACKGROUND OF THE INVENTION

1. Field of the Invention

This invention relates in general to the construction of delivery systems for dispensing precise quantities of material and in particular to a new and useful dosing system for feeding powdery or granular material which is delivered through a separate coarse dosing conduit and subsequently through a fine dosing conduit.

2. Description of the Prior Art

There are many known dosing devices in which the material flow is fed from a delivery line by switching it into a secondary line which is branched off from the main line and which is opened up into a weighing receptacle. At a certain switch off point the flow is switched back and the further material in the delivery line is fed back into a receiving bunker through a ring shaped conduit portion. In addition similar devices are known in which two switch off points are provided and the entire material flow is first directed in the manner of a coarse dosing into the weighing receptacle and upon reaching the first switch off point the device is switched over to an intermediate position in which a fine dosing takes place. As soon as the second switch off point is reached a further feeding of the material into the weighing receptacle is completely stopped and a ring shaped conduit portion connected back again to the receiving bunker. These known dosing devices are suitable on condition that, the delivery of the material is accomplished by means which insure a uniform feeding free from thrust and in particular is applicable for delivering fluid or air suspended material. In addition the material still present in the line at the moment of the switching off must always be reconveyed into a silo or a receiving bunker. Thus in the pneumatic systems in which the material is passed into a weighing receptacle in the form of individual plugs, the devices which are known cannot be used because the kinetic energy of the incoming plug would lead to an incorrect weighing. In mechanical balances, the momentum of the material plug causes an oscillation of the balance and also produces an incorrect weighing. Thus it is not sufficient to close the valve in the delivery line and obtain the desired weight because the balance can oscillate both toward the short weight and toward an overweight.

SUMMARY OF THE INVENTION

The present invention provides an improved dosing device for pneumatic delivery systems for feeding powdery granular and similar materials. The invention recognizes that it is useful to accumulate a partial quantity of the material to be fed during the actual feeding of this material in a coarse dosing. With the inventive device the material is accumulated in a separate space and this partial quantity is kept as a reserve for effecting a fine dosing of the necessary additional quantity by the operation of a separate feeding mechanism. The arrangement has the advantage that during the coarse dosing the momenta of the material plugs which are moved due to the air pressure in the pneumatic transportation system do not affect the accuracy of the final weight. The reason is that after reaching a preliminary signal the quantity of material accumulated in the special space of the second conduit is additionally dosed into the weighing receptacle in a uniform fine flow.

In accordance with a preferred arrangement of the invention the pneumatic delivery system includes a pneumatic delivery tube having a coarse discharge and with a portion thereof connected to a second delivery tube having a fine discharge. An intermediate housing formed between the first and second tubes is provided with a screen through which the materials may pass from the first tube to the second during the actual coarse dosing. Both the fine and coarse discharges open into the same weighing receptacle and the fine discharge is operated after the coarse discharge is terminated. It receives a partial quantity of the pneumatically delivered material and after the delivery has been shut off it remains in operation until a predetermined weight of the material is fed into the weighing receptacle.

The invention arrangement advantageously provides a rotatable feed screw in the second or fine delivery conduit and the material is advanced in a horizontal direction for discharge into the weighing receptacle either horizontally or vertically. The feed screw advantageously extends up to the interior of the weighing receptacle and in addition it is advisable to provide an additional support for the tube accommodating the feed screw. In addition if desired a downwardly extending tubular connection may be provided at the exit of the feed screw leading from the tube accommodating the feed screw to the weighing receptacle. In such case the tubular connection comprises an automatically controlled shut off element and advantageously an elastic intermediate member.

It is further possible to mount the tube so that it may be vibrated and to connect the fine dosing conduit to the weighing receptacle through an elastic intermediate connection and to provide advance of the material by a vibration feed. In such a case both the first coarse discharge conduit and the second fine discharge conduit may be mounted together on a resilient support and elastically connected to the associated weighing vessel.

Accordingly it is an object of the invention to provide a dosing device for a pneumatic delivery system of powder granular and similar material which comprises a first delivery tube defining a first conduit for coarse dosing having a coarse dosing discharge and a second delivery tube defining a second conduit for fine dosing discharge which is connected to the first through an intermediate housing having a screen therein permitting a flow of some of the material from the first conduit to the second during the actual operation of the first conduit so that it is still put in the second conduit and which also includes means associated with the second conduit for feeding the material through the fine dosing discharge after the pneumatic flow of material to the first conduit is cut off.

A further object of the invention is to provide a dosing device which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

GENERAL DESCRIPTION OF THE PREFERRED EMBODIMENTS

Figure 1:
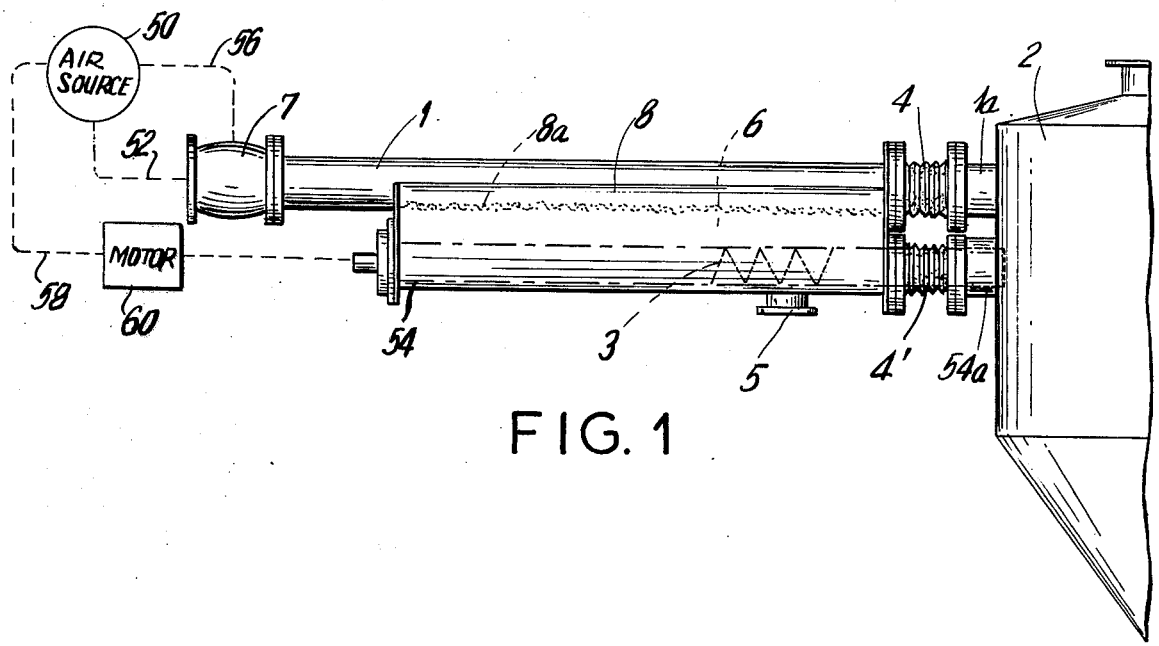
FIG. 1 is a partial side elevational view indicating a pneumatic feed system for delivering material into a weighing receptacle constructed in accordance with the invention.

Referring to the drawings in particular the invention embodied therein in FIG. 1 comprises a pneumatic delivery system in which material is to be fed into a weighing receptacle 2. The feed system is a pneumatic system which includes a usual pneumatic or air power supply which is schematically indicated at 50 which is connected so as to feed material through a connecting line 52 through a closing valve 7 into a first delivery tube or coarse dosing tube 1. The coarse dosing tube 1 is mounted on the weighing receptacle 2 through a flexible connection 4 so that it discharges horizontally into the receptacle 2 during the opening of the valve 7.

In accordance with the invention a second conduit or fine delivery tube 54 is mounted below the tube 1 and it is communicated with the interior of tube 1 through an intermediate housing or connection 8. The housing 8 defines an intermediate space 6 above a feed screw which is rotatably mounted in the second conduit 54. The intermediate housing 8 includes an internal screen 8a which permits some portion of the material fed through the first conduit 1 to fall into the intermediate space 6 above the screw 3.

During operation the pneumatic system 50 is operated with the valve 7 open to deliver material through the first delivery conduit 1 and to discharge it through a coarse discharge 1a into the weighing receptacle 2. When the quantity of material which is to be fed to the receptacle 2 approaches the value desired which for example may be indicated on a weighing scale then the valve 7 is closed. Prior to the closing of the valve 7 some of the material falls through the screen 8a into the space 6 above the feed screw 3.

Advantageously the closing of the valve 7 produces a signal which is transmitted through a line 56 which is schematically indicated to the pneumatic control system 50 and thence through a line 58 to a drive motor 60 for rotating the screw 3. The motor 60 is operated as soon as the valve 7 is closed to cause a rotation of the feed screw and a dispensing of the material which is fed into the intermediate space 6 out through a fine discharge 54a. In the embodiment of FIG. 1 a support 5 is provided for supporting the second conduit 54 with the feed screw and the drive motor 60 and a flexible connection 4' connects the discharge 54a to the receptacle 2.

The system shown in FIG. 1 is usually associated with a weighing system in which the signal is generated by the weighing apparatus to effect the closing off of the valve 7. Thereafter the material accumulated in the intermediate space 6 is fed as a fine stream into the weighing receptacle 2 by the feed screw 3. Separate means are also advantageously provided to stop the drive motor 60 for the feed screw and discontinue all feeding when a sufficient quantity of fine dosing through the discharge 54a is accomplished.

Figure 2:
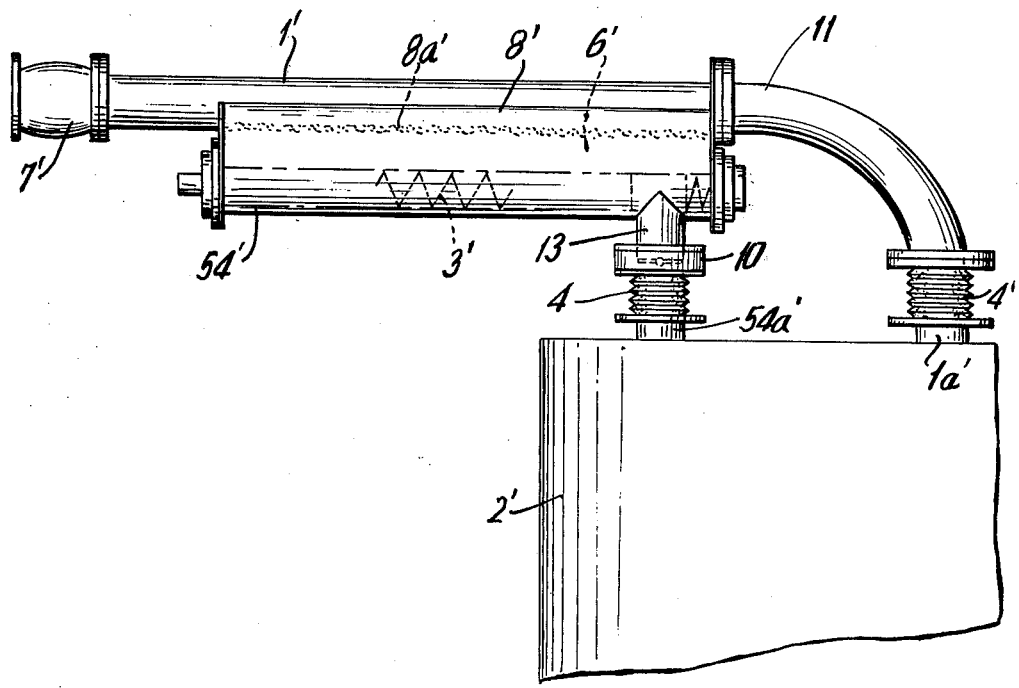
FIG. 2 is a view similar to FIG. 1 of another embodiment of the invention.

The embodiment in FIG. 2 is substantially the same as that of FIG. 1 with the exception that a second conduit or fine delivery conduit 54' includes a downward extension 13 which is connected through a valve 10 and a flexible connection 4 to a fine dosing discharge 54a which extends vertically downwardly into the weighing receptacle 2. In this showing the feed screw 3' is rotated by a drive motor (not shown) to advance the material accumulated in a space 6' into the downward extension 13. The shut off valve 10 at the outlet from the feed screw may be controlled to shut off as soon as the desired weight is obtained so that no further material can trickle into the weighing receptacle and therefore the weighing accuracy will be improved. In this construction a bend 11 is positioned on the first conduit 1' and it is mounted to a flexible connection 4' as in the other embodiment. The first conduit 1' also discharges through a coarse discharge 1a' in a downward direction.

Figure 3:
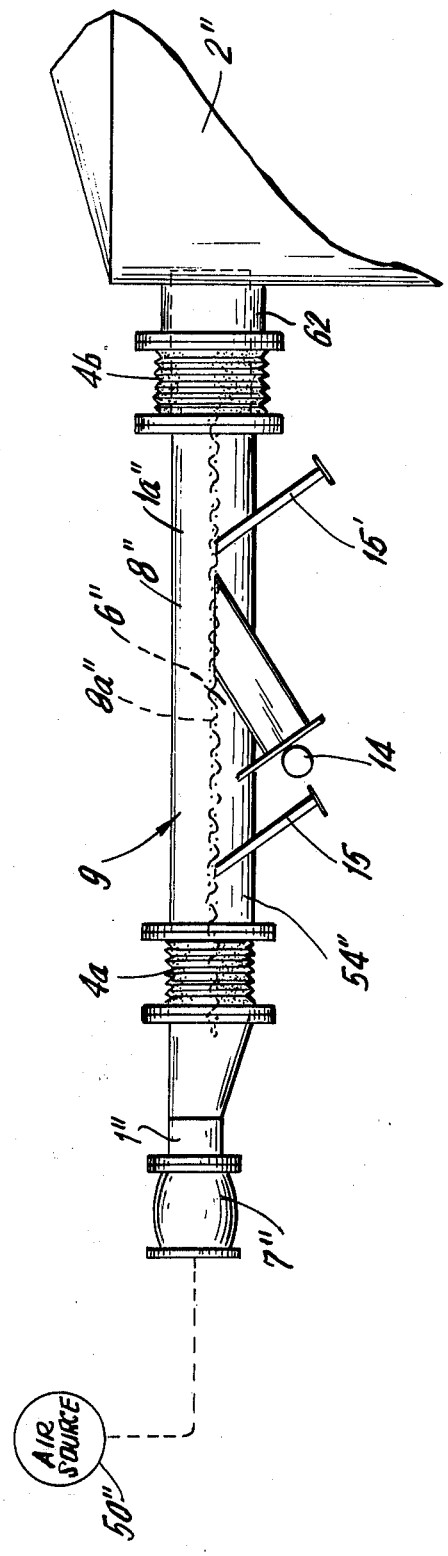
FIG. 3 is a view similar to FIG. 1 of still another embodiment of the invention.

In the embodiment shown in FIG. 3 similar parts are similarly designated but with double primes. In this embodiment a first conduit 1'' is is divided so that it includes a second conduit portion 54'' for the discharge of the material in a fine dosing. A screen 8'' is located to extend through a portion of the conduit 1'' so as to divide it into an upper coarse conduit delivery portion 1a'' and a lower fine conduit discharge portion 54'' which discharge outwardly through a discharge 62 into a weighing receptacle 2. In this embodiment the two conduits include a central section 9 which are supported at respective ends on elastic connections 4a and 4b and which is vibrated by a vibrator connection 14 so as to cause a vibration of this section on supports 15 and 15'. When the valve 7'' is closed off the vibration equipment 14 is operated to dispense the material from the fine conduit portion 54'' through the discharge 62 into the weighing tank 2. The vibration equipment 14 is timed to operate upon the closing of the valve 7 and also is cut off whenever the weighing equipment associated with the weighing tank 6 indicates that a sufficient quantity of material has been fed.

While specific embodiments of the invention have been shown and described in detail to illustrate the application of the principles of the invention, it will be understood that the invention may be embodied otherwise without departing from such principles.

What is claimed is:

1. A dosing device for pneumatic delivery systems particular for handling powdery granular and similar materials, comprising a first delivery tube portion defining a first conduit portion for coarse dosing having a coarse dosing discharge, a second delivery tube portion defining a second conduit portion for fine dosing having a fine dosing discharge, means establishing a communication between said first and second conduits, screen means disposed in the communication between said first and second conduits for the passage of materials of selected size therethrough, valve means associated with said first delivery tube at a spaced location from said coarse dosing discharge for isolating said delivery tube from the pneumatic delivery system, and feed means associated with said second conduit for delivering material in said second conduit out through said fine dosing discharge after said valve means is closed.

2. A dosing device according to claim 1, wherein said feed means comprises a rotatable feed screw in said second conduit.

3. A dosing device according to claim 2, including a support for supporting said second conduit, said second conduit extending substantially horizontally and discharging horizontally through said fine dosing discharge.

4. A dosing device according to claim 1, wherein said second conduit includes a downwardly extending portion adjacent its discharge end terminating in a downwardly directed dosing discharge, said second conduit having a horizontal portion, said feed means comprising a screw rotatable in said horizontal portion to advance material in a direction toward said downwardly extending discharge, and a valve in said downwardly extending discharge for opening and closing said fine dosing discharge.

5. A dosing device according to claim 1, wherein said feed means comprises means for vibrating said second conduit portion to advance material therein, said second conduit portion being suspended by elastic support means.

6. A dosing device according to claim 1, wherein said means defining a communication between said first delivery tube and said second delivery tube includes an intermediate housing portion between said first and second delivery tubes and defining a space therebetween for the accumulation of material, said screen means comprising a screen disposed between said intermediate housing portion and said first delivery tube portion, a weighing receptacle located to receive material from said coarse dosing discharge and said fine dosing discharge, and flexible connection means for connecting said first and second delivery tubes to the weighing receptacle.

7. A dosing device according to claim 1, wherein said first and second delivery tubes are formed as a single unit with said first conduit portion for coarse dosing being located over said second conduit portion for fine dosing, said screen means being located between said first conduit portion and said second conduit portion, an elastic connection at each end of said first and second conduit portions for resiliently supporting them, support means connected to said conduit for vibrational support thereof, and said feed means comprising a vibrator connected to said intermediate section of said first and second conduits for vibrating said conduits to feed material through said fine dosing discharge after said valve means is closed.

8. A dosing device according to claim 7, wherein said coarse dosing and said fine dosing discharge lead to a single combined discharge.

* * * * *